(12) United States Patent　　(10) Patent No.: US 7,812,611 B2
Johnstad et al.　　　　　　　　(45) Date of Patent: Oct. 12, 2010

(54) SHALLOW MARINE ELECTROMAGNETIC HYDROCARBON PROSPECTING

(75) Inventors: Svein Erling Johnstad, Bønes (NO); Brian Anthony Farrelly, Rådal (NO)

(73) Assignee: Norsk Hydro ASA, Oslo (NO)

( * ) Notice: Subject to any disclaimer, the term of this patent is extended or adjusted under 35 U.S.C. 154(b) by 559 days.

(21) Appl. No.: 11/794,665

(22) PCT Filed: Jan. 9, 2006

(86) PCT No.: PCT/NO2006/000007

§ 371 (c)(1),
(2), (4) Date: Sep. 12, 2007

(87) PCT Pub. No.: WO2006/073315

PCT Pub. Date: Jul. 13, 2006

(65) Prior Publication Data

US 2009/0267608 A1　　Oct. 29, 2009

(51) Int. Cl.
G01V 3/15　　(2006.01)
G01V 3/12　　(2006.01)

(52) U.S. Cl. ..................... 324/365; 324/357

(58) Field of Classification Search ............... 324/332, 324/334, 337, 354, 357, 365; 702/7, 11–13
See application file for complete search history.

(56) References Cited

U.S. PATENT DOCUMENTS 4,616,184 A　　10/1986　Lee et al.
6,339,333 B1　　1/2002　Kuo
6,628,119 B1　　9/2003　Eidesmo et al.
2003/0052685 A1　　3/2003　Ellingsrud et al.

FOREIGN PATENT DOCUMENTS

| RU | 1122998 | 3/1993 |
| SU | 1805425 | 11/1984 |
| WO | 03/048812 | 6/2003 |
| WO | 2004/083898 | 9/2004 |

*Primary Examiner*—Bot L LeDynh
(74) *Attorney, Agent, or Firm*—Wenderoth, Lind & Ponack, L.L.P.

(57) ABSTRACT

A method for determining electrical properties of a submarine petroleum fluid-bearing formation (1) under overburden geological layers (2) of thickness (s) under a seafloor (3) of a sea. The method includes:
*arranging one or more transmitter antennas (9) in the sea, and arranging one or more electromagnetic receivers (8) in the sea, *the sea having a shallow sea depth (d) of 50-350 meters; *using the transmitter antenna (9) transmitting electromagnetic signals (10) of one or more pulses (11) having frequency of very low frequency between 0.01 Hz and 0.10 Hz; *using the receiver antennas (8) having an offset from the transmitter (9), for receiving propagated electro-magnetic signals (12) due to the emitted electromagnetic signals (10); *analyzing one or more components of the received signals (12) from receivers (8) having offsets between about 1 km and 12 km, whether the signals (12) differ significantly from a corresponding signal that would occur from a water-bearing formation (1), indicating a petroleum fluid-bearing formation (1).

17 Claims, 10 Drawing Sheets

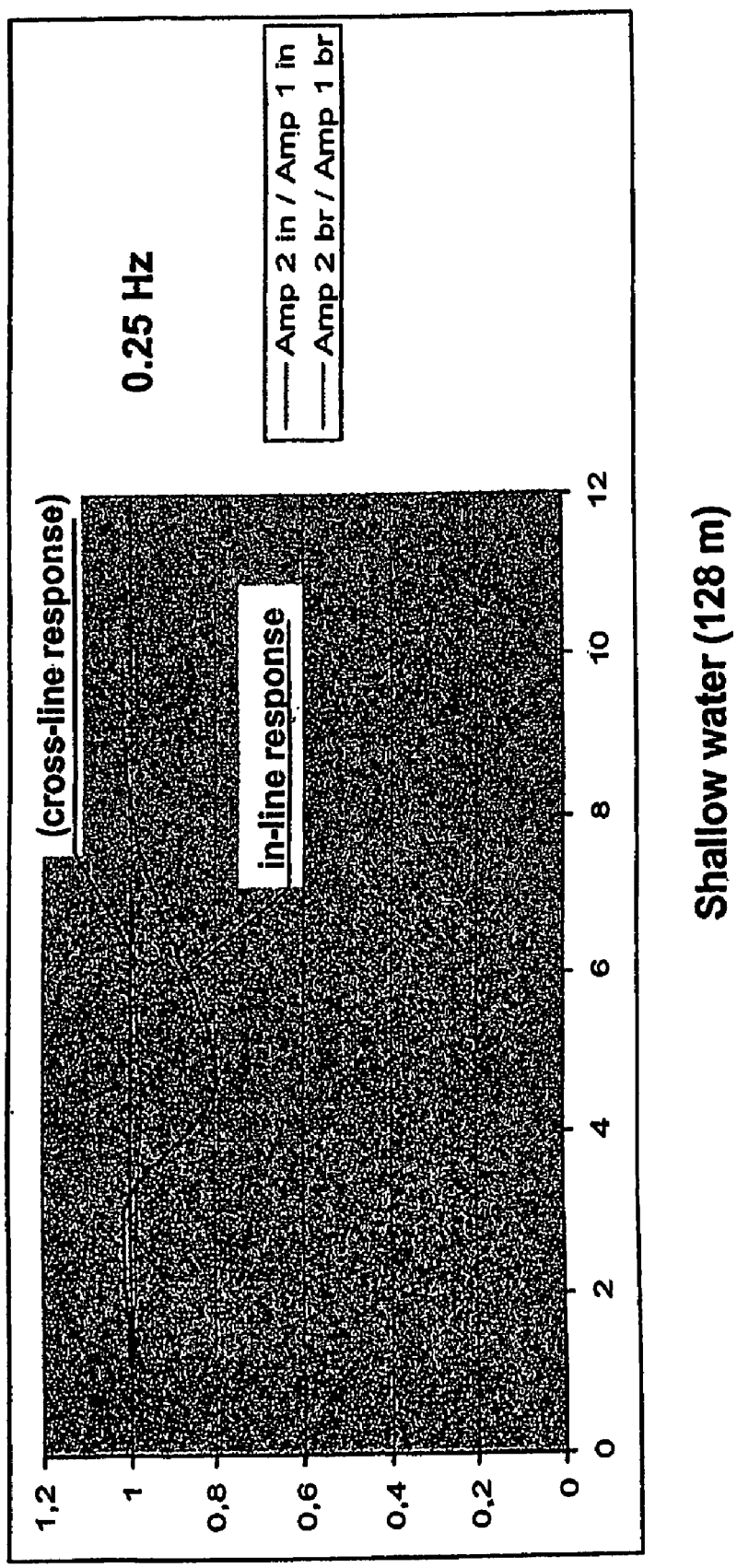
Fig. 3 — normalized curve from Fig. 2

Shallow water (128 m)

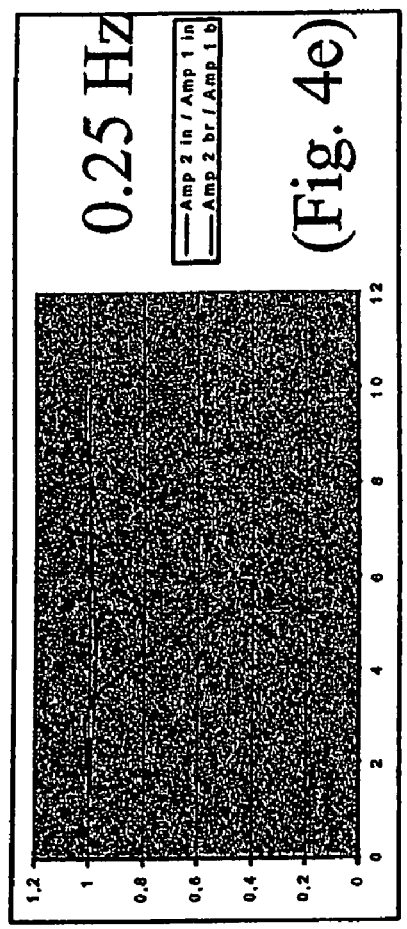
(Fig. 4e)
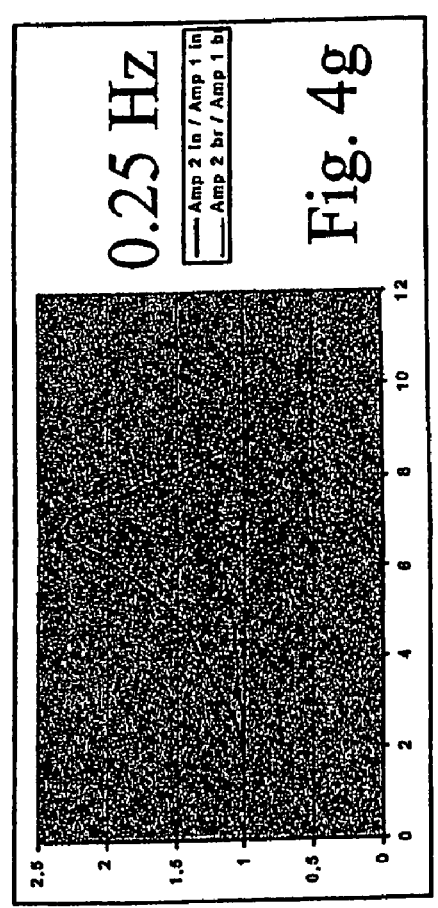
Fig. 4g

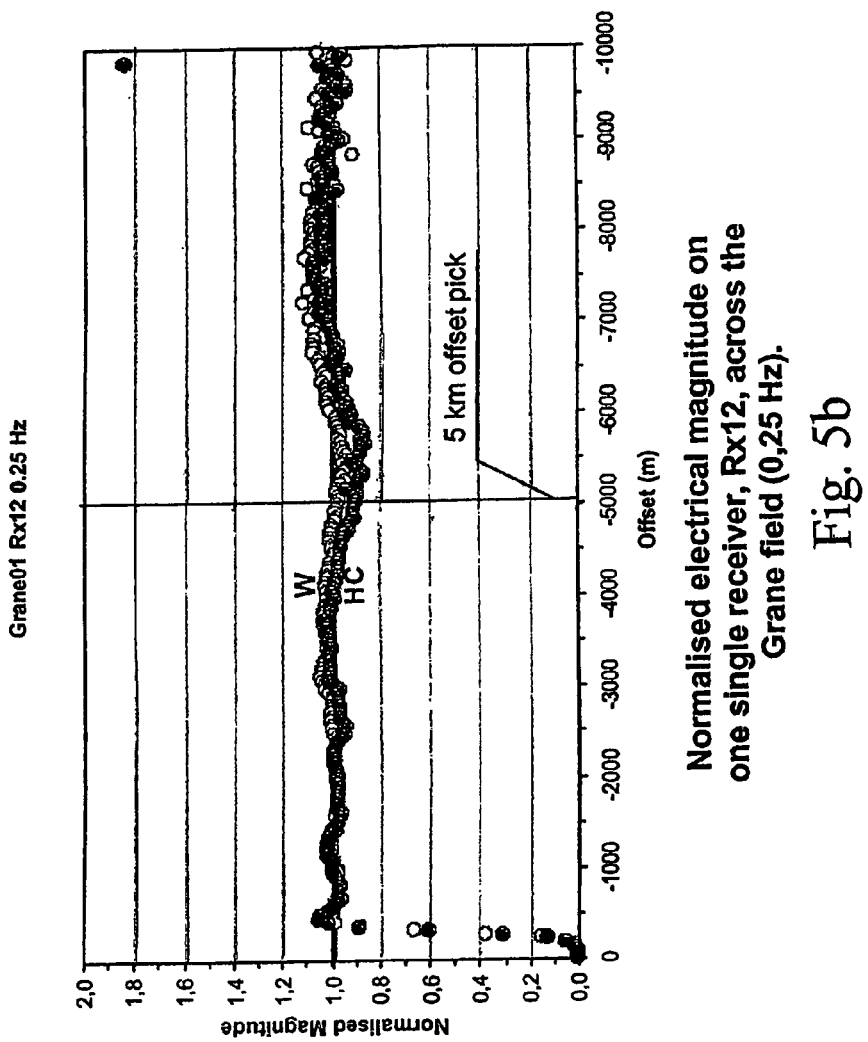
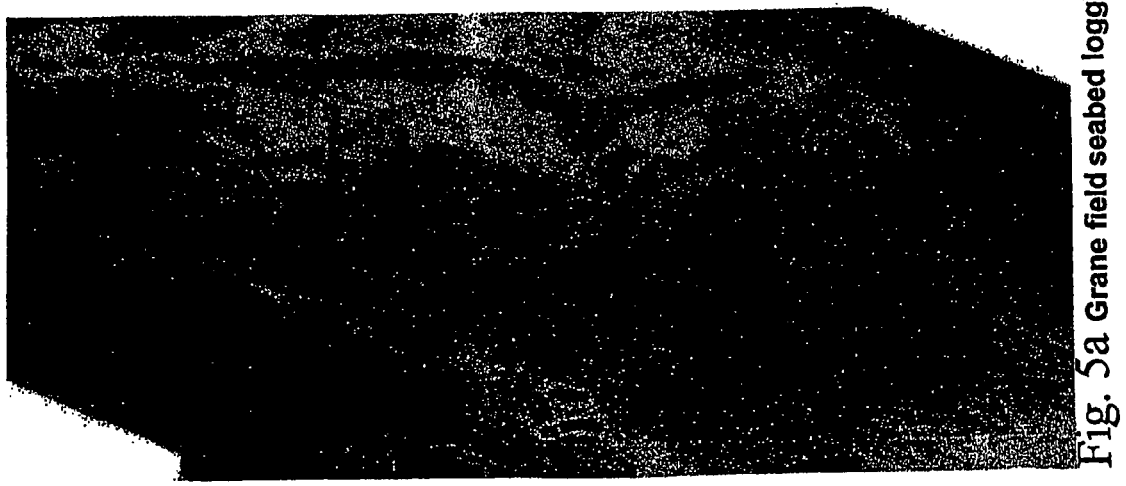
Fig. 5a Grane field seabed logging program 2003
Fig. 5b

Fig. 6a Grane field seabed logging program 2004

SHALLOW MARINE ELECTROMAGNETIC HYDROCARBON PROSPECTING

BACKGROUND OF THE INVENTION

1. Technical Field of the Invention

The present invention relates to marine geophysics using electromagnetic detection of buried geological formations. The invention is particularly useful for determining whether a prospective petroleum reservoir indicated in seismics is oil-bearing, and also desirably the horizontal extension of the petroleum reservoir, and determining a range for some of the electrical properties of the petroleum reservoir. The depth, the extension and particularly the electrical properties may provide important information about whether a volume of oil in the reservoir may be distinguished from ubiquitous pore water that is generally present in most porous subterranean rocks.

More specifically, the invention relates to a method for generating very long-wavelength electromagnetic signals under the sea, and detecting electromagnetic waves under the sea, some of which waves have traveled downward, along and upward through geological layers under the sea, as indicated in FIG. 1a. Such very long-wavelength electromagnetic waves for use in the present invention are similar to radio waves, but are of much longer wavelength. Electromagnetic waves are quite severely attenuated in the sea and in the ground due to the electrical resistivity of the rocks with more or less saline water. The attenuation is most severe for higher frequencies. But given a strong electromagnetic source and a very sensitive receiver, and using a low frequency, a signal having traveled through seawater and the ground may be detected at the receiver. Generally sedimentary layers may form an overburden over a deeply buried porous geological layer being a prospective hydrocarbon reservoir. Some of the electromagnetic waves have been reflected by the prospective hydrocarbon reservoir, and some of the waves may have been refracted along the prospective hydrocarbon reservoir. A small proportion of the reflected or refracted electromagnetic energy will reach back to the seafloor in the form of electromagnetic waves, and be measurable with electromagnetic antennae.

2. Description of the Related Art

Several geophysical and direct methods may be used for detecting the presence of a petroleum reservoir. The methods applied may be used in different sequences, depending on the amount of knowledge acquired from previous exploration steps. Magnetometry may be used to determine and map depths to the bedrock below a sedimentary basin, and is rapidly and cheaply measured. Gravity measurements may delineate volcanic stocks and sills that will have a positive gravity anomaly, and salt dome features will display a negative anomaly in gravity profiles and maps. A petroleum reservoir may display a negative gravity anomaly due to the fact that the petroleum fluids are of less density compared to the water that they displace, but such features are usually not of significant size to be directly detected, but may constitute a significantly measurable difference during production of the field. Gravity measurements are also rather rapidly acquired, but rather more time-consuming as compared to magnetometry.

Electromagnetic prospecting uses electromagnetic signals of a wavelength sufficient to penetrate the geological layers under the sea. Detecting the electromagnetic waves may take place either at the seafloor or in the sea water.

Such electromagnetic prospecting may be used to delineate some geological layers of higher or lower resistivity than their surrounding geological formations. A transmitter antenna is used in the sea for transmitting electromagnetic waves that propagate through the sea and the geological formations. A small proportion of refracted and reflected electromagnetic energy will reach back to the seafloor and be detectable. The detected signals are analysed to indicate petroleum-bearing formations. FIG. 1a indicates such electromagnetic prospecting.

Seismic prospecting utilizes low-frequency sound waves from a seismic source, the waves propagating through the sea and the ground to a seismic receiver. The velocity of seismic waves depend on the density and other mechanical properties of the rocks they propagate through, and the propagation mode of the wave, either as a compression or "p"-wave having the particle motion along the line of seismic energy propagation, or as a transversal, shear or "s"-wave having its particle motion normal to the line of seismic energy propagation. Marine seismics requires a dedicated seismic source and a highly sensitive array of seismic receivers, usually in the form of one or more towed seismic streamers with hydrophones or seabed cables with hydrophones and geophones, and is a far more time-consuming and expensive process compared to gravity. Marine seismics may provide high-resolution reflection seismic profiles that may be processed to show sections of geological structures indicating potentially petroleum bearing petroleum traps, like a porous sand formation in an antiform and covered by an impermeable sedimentary layer, or a porous sand formation vertically offset by a fault. Such delineated potential petroleum-bearing formations however, may rarely be distinguished on the basis of their seismic velocities, because the density and thus the seismic velocity of an oil-bearing formation is only slightly less than the seismic velocity of the same formation being water-filled. However, when having found a potential petroleum bearing formation in the seismic profiles, electromagnetic prospecting may be used to determine some electrical properties of the formation, indicating the presence of water or petroleum, as will be described below.

Drilling is the ultimate and most expensive method to provide geological information about a prospective reservoir. Based on gravity, electromagnetic and seismic exploration and general geological information, an evaluation of the potential field is made. The positions of first exploration or "wildcat" holes are determined and drilled when some or all of the above less expensive methods like gravity and seismics indicate the presence of a petroleum reservoir. Then, if positive results are obtained, production wells are drilled. To find a reasonable indication of the horizontal extension of a reservoir, so-called appraisal or delineating wells may be drilled.

A major practical problem in marine electromagnetic geophysics is the fact that the sea is conductive, having a conductivity of about 0.3 Ohm-meter due to its salinity. The conductivity incurs significant signal attenuation as the electromagnetic waves propagate through the conductive saline water. Also a major proportion of the rocks from the seafloor and down through all the overburden are more or less conductive, having a conductivity that may vary from 0.3 for generally seawater-wet unconsolidated porous seafloor sediments, to 10 Ohm-meter for more consolidated sediments containing less salt and less ion mobility. However, the electrical properties of a petroleum-bearing rock are significantly different from a saline water-bearing rock. A petroleum bearing sandstone may have a conductivity of about 20-300 Ohm-meter. An deep waters, Ellingsrud et al. in U.S. Pat. No. 6,717,411 have used a transmitter in the form of a towed horizontally arranged dipole electrode pair of 100-1000 m separation and using a 1 Hz alternating current. The wavelength/of the transmission is indicated to be in the range 0.1s<=l<=5s and more preferably
0.5s<=l<=2s where l is the wavelength of the transmission through the overburden of thickness s. In the example described, the thickness s is 800 m, indicating 80 m<=l<=4000 m, more preferably
400 m<=l<=1600 m.

The sea depth used in Ellingsruds examples is 1000 m, and the resistivity of the overburden is 0.7 Ohm meter. For wavelengths through the overburden as preferably indicated 80 m<=l<=4000 m, more preferably
400 m<=l<=1600 m, this indicates frequency ranges of
1100 Hz<=f<=0.44 Hz, more preferably
44 Hz<=f<=2.7 Hz.

The preferred wavelengths indicated by Ellingsrud do not correspond with the indicated transmission frequency range indicated:

1 kHz <=f<=0.01 Hz, more preferably
20 Hz <=f<=0.1 Hz, for example
1 Hz.

The actually used frequency in Ellingsrud's example is 1 Hz, giving an actual wavelength of 421 m if the resistivity of the overburden is 0.7 Ohm meter.

When towing the transmitter antenna near the seafloor at a sea depth of 1000 m like in Ellingsrud's example, due to the conductivity of the sea water, the air wave poses no significant problem. The sea depths relevant to our present invention may be about 50 to about 350 meters, far shallower than in the above-mentioned US Patent. The depth may even be as shallow as 20 meters or even 10 meters. The air wave is believed to be a significant problem when using a frequency of about 0.5 Hz, please see FIG. 4F, in which there is an insignificant deviation in the normalized curve for a petroleum-bearing reservoir when measuring at a water depth of 128 m. The thickness of the overburden may be between 500 and 3000 meters in the present invention. One may also consider using the present method for verifying the presence of shallow gas as methane or so-called gas hydrates found using shallow seismics at depths shallower than 500 meters. Such gas hydrates may be indicated in the shallow seismics in that their seismic reflection contour follows more or less the contour of the sea floor, but may be verified using electromagnetic methods to indicate a higher resistivity.

One disadvantage of the known art is the use of sine wave pulses, in which the wave is a continuous wave, being difficult to maintain when produced in marine electrical generators that in practice shall be more or less short-circuited through transmitter antennas in the sea. A simpler signal source is sought in the present invention.

SUMMARY OF THE INVENTION

One solution to some of the above-mentioned problems is a method for determining electrical properties of a submarine petroleum fluid-bearing formation under overburden geological layers of thickness s under a seafloor of a sea, the method comprising the following steps:

arranging one or more transmitter antennas in the sea, and
arranging one or more electromagnetic receivers in the sea, the sea having a shallow sea depth d of about 50 meters to about 350 meters;

using the transmitter antenna transmitting electromagnetic signals of one or more pulses having frequency of very low frequency between about 0.01 Hz and about 0.10 Hz;

using said receiver antennas having an offset from said transmitter, for receiving propagated electromagnetic signals due to said emitted electromagnetic signals;

analysing one or more components of said received signals from receivers having offsets between about 1 km and about 12 km, whether said signals differ significantly from a corresponding signal that would occur from a water-bearing formation, indicating a petroleum fluid-bearing formation.

In a preferred embodiment of the invention, a square pulse signal of frequency f=0.01 Hz to 1.10 Hz, preferably about 0.02 Hz is emitted. The square pulse signal has at least a harmonic component of 3*f detectable at said offset.

BRIEF DESCRIPTION OF THE DRAWINGS

The invention is illustrated in the enclosed drawings, which are meant for illustration purposes only. The drawings shall not be construed to limit the scope of the invention, which shall be limited by the attached claims only.

$$(V/m)/(Am) = V/Am^2,$$

and is a source-normalized amplitude often called "magnitude".

Figure 1A:
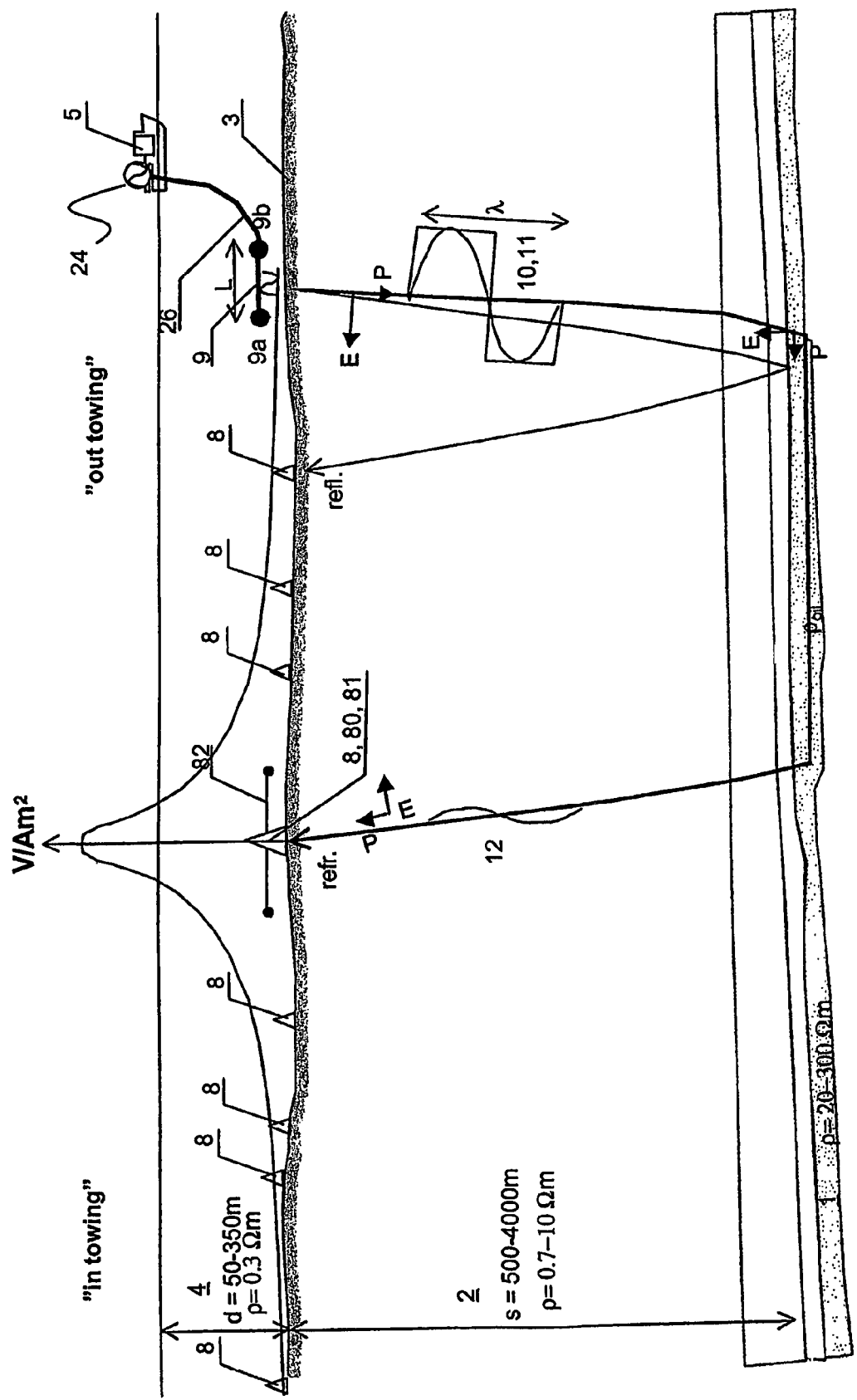
FIG. 1a illustrates an imagined geological section of a sedimentary formation forming a petroleum reservoir, and having an overburden of about 500 m to 3000 m and a water depth of about 50 m to 350 m. The depth may be even as shallow as 20 or 10 meters. A ship tows a marine electromagnetic horizontally arranged signal source. The inbound leg is called the <<in towing>> portion of the curve with the transmitter approaching the receiver, and the outbound leg is correspondingly called <<out towing>>. Both reflected and refracted electromagnetic signal paths are shown between the transmitter and the receiver. Also indicated in FIG. 1a is a horizontal component of the received field, shown in a logarithmic scale. In the near field the voltage may be very strong, so it is recommended to tow the transmitter about 50 m to 70 m over the receivers at the seafloor, otherwise the receivers may be damaged due to the strong electromagnetic field when the transmitter passes through the sea over the receiver.
Figure 1B:
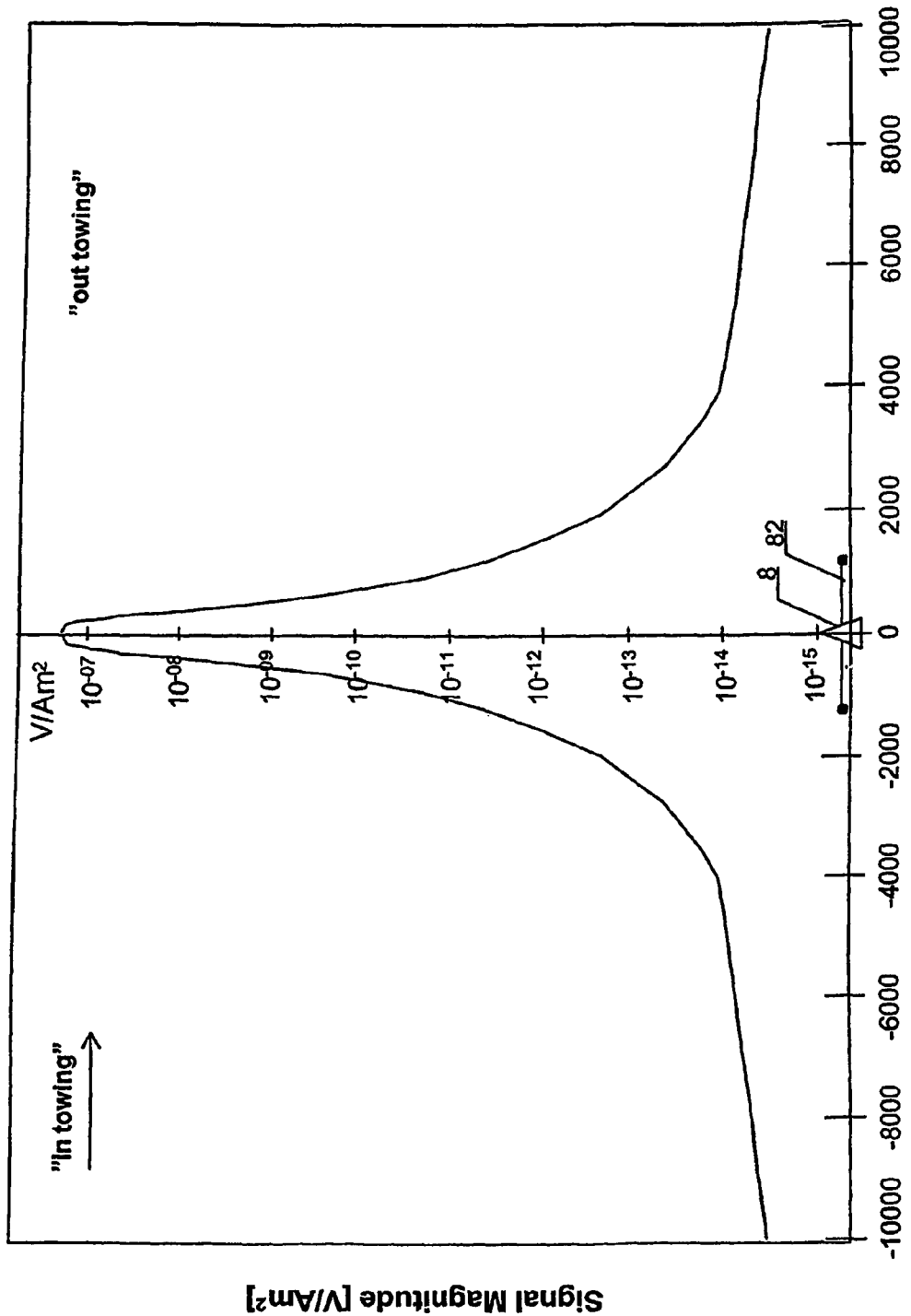
FIG. 1b is a simple illustration of the electromagnetic field as measured over one single receiver according to the field set-up of FIG. 1a. One single receiver with antennas is put into the figure at zero offset.

FIG. 3 illustrates normalized curves in which a signal amplitude curve of an anomalous formation of high resistivity, e.g. due to being petroleum-bearing, with overburden of ordinary resistivity, like in FIG. 1a, is divided by a corresponding signal amplitude curve as if the petroleum of the same formation is replaced by water resulting in ordinary resistivity. The offset along the abscissa is given in kilometers. The normalized <<water curve>> indicating water, is a reference curve based on water-bearing reservoir formations, is given the value 1.

Figure 4A:
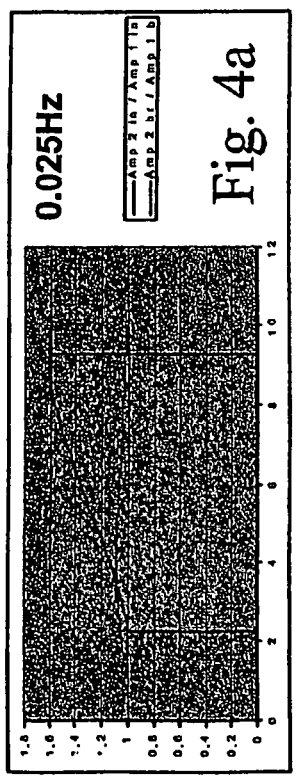

FIG. 4a is such a normalized measurement curve of the horizontal in-line field for a transmitted frequency of 0.025 Hz, i.e. a period of 40 seconds, and a water depth of 128 m. The thickness of the model is about 1600 m overburden of resistivity 1 Ohm-meter, and the reservoir thickness of the model is about 100 m having a resistivity of 80 Ohm-meter. For hydrocarbon detection in the present case with more or less horizontal petroleum-bearing formations, the in-line response is considered more important than the cross line response. In areas with lithological complications like salt deposits, the cross-line response may be more important.

Figure 4B:
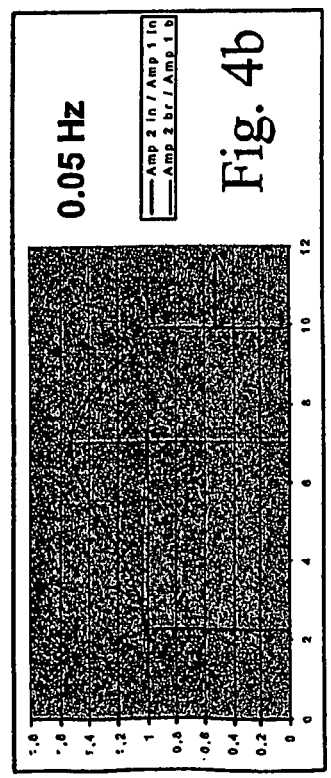

FIG. 4b is a corresponding normalized curve for a transmitted frequency of 0.05 Hz, i.e. a period of 20 seconds.

Figure 4C:
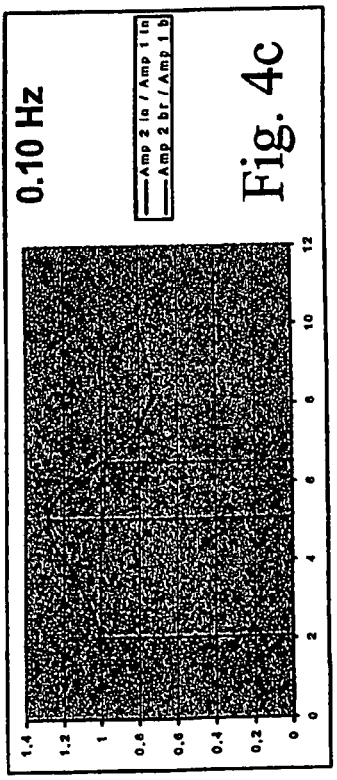

FIG. 4c is a corresponding normalized curve for a transmitted frequency of 0.10 Hz, i.e. a period of 10 seconds.

Figure 4D:
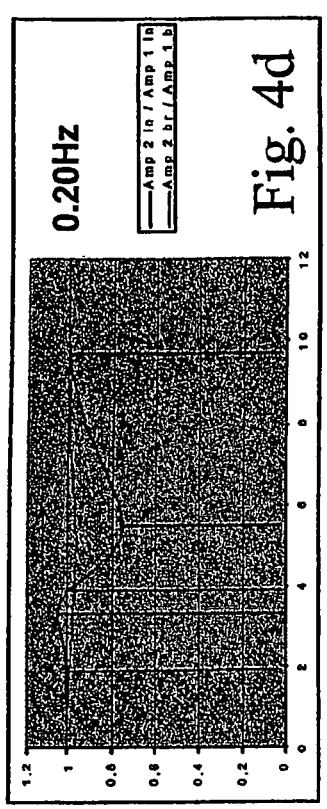

FIG. 4d is a corresponding normalized curve for a transmitted frequency of 0.20 Hz, giving a period of 5 seconds.

Figure 4E:
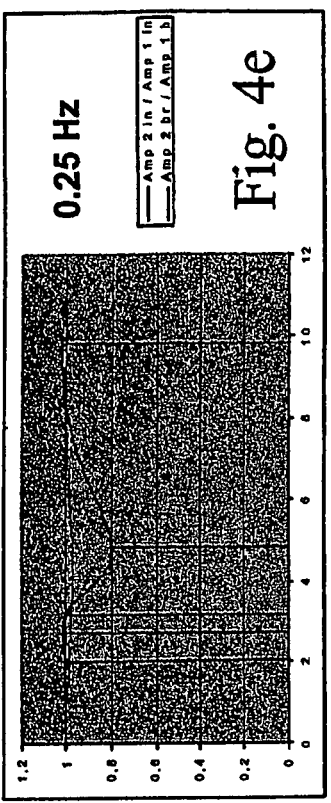

FIG. 4e represents the corresponding curve for 0.25 Hz, i.e. a period of 4 seconds.

Figure 4F:
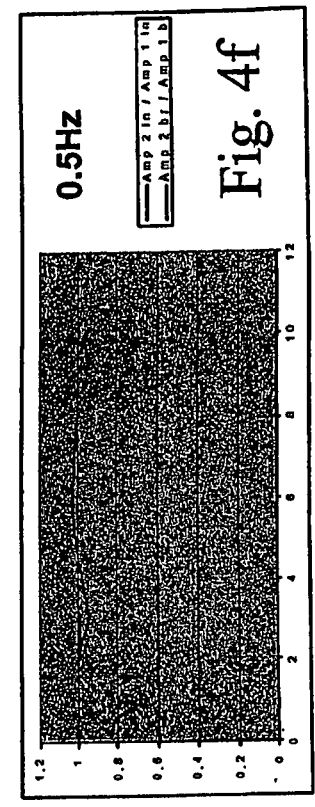

FIG. 4f represents the curve for 0.5 Hz, i.e. a period of 2 seconds.

FIG. 4g is a normalized curve for 0.25 Hz and deep water, here 1024 m. It has been assembled on the same sheet as a copy of FIG. 4e showing the corresponding curve for 0.25 Hz and shallow water conditions, here 128 m. One major difference between the two cases is that a portion of the shallow-water emitted signal will leak to the air and will dominate the recorded signals at greater offsets.

FIG. 5a is a map of the Grane oilfield in the North Sea. The reservoir portion of the reservoir formation is roughly outlined. A north-south running electromagnetic survey line from 2003 is indicated across the map.

FIG. 5b is a normalized electrical magnitude plot as received on one single receiver, Rx12, for a transmitted frequency of 0.25 Hz.

Figure 5C:
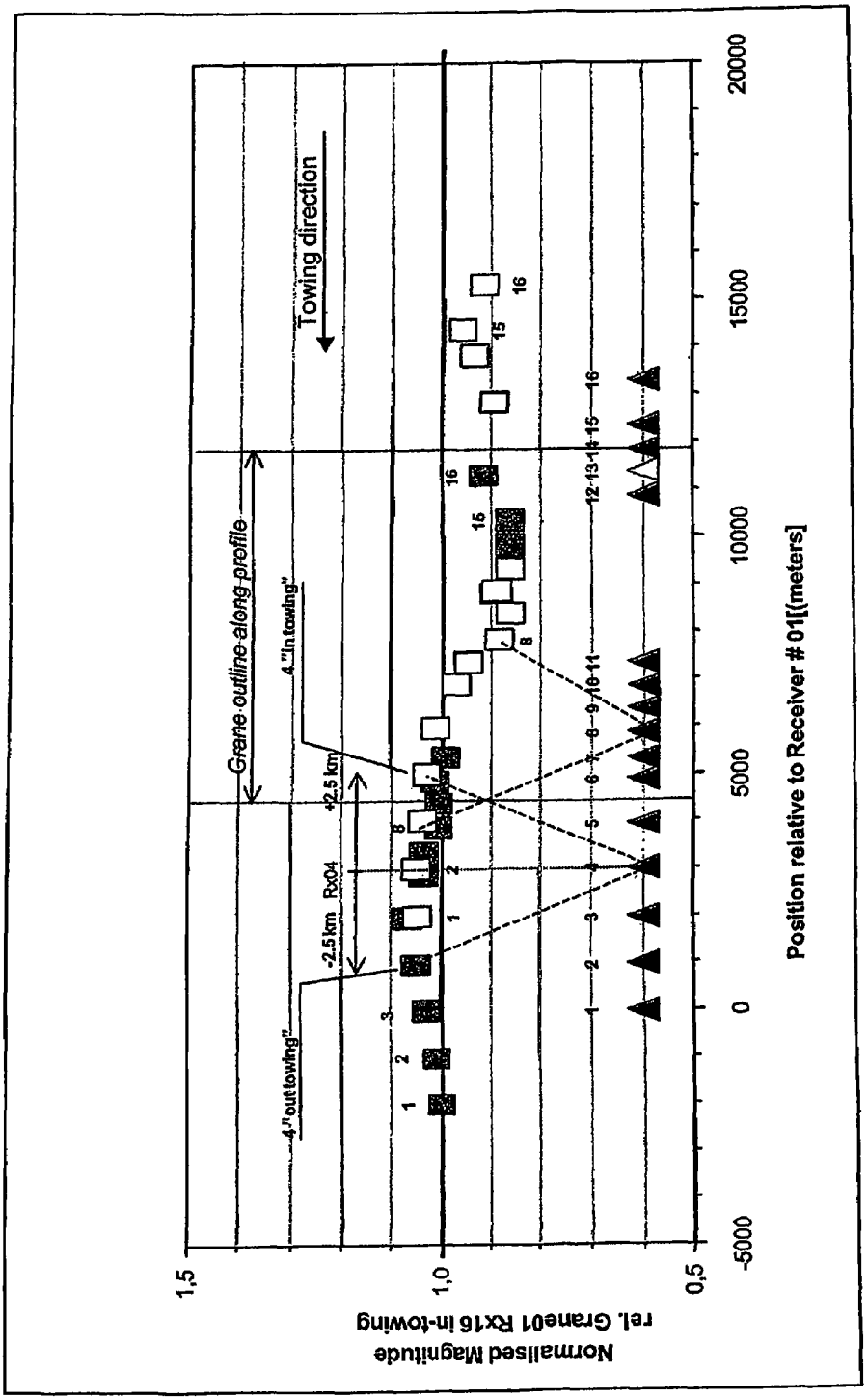

FIG. 5c shows a summary plot of normalized electrical magnitude for all receivers. The abscissa is in meters. The receivers numbered 1 to 16 are indicated along the abscissa, and correspond to the profile line shown in FIG. 5a. In this plot, the normalized electrical magnitude for one particular source-receiver offset is picked from each registration from the stations Rx1 to Rx16. The offset for the picked normalized field value is 5 km. It is assumed that the 5 km offset registration indicates an electrical property value of the potential petroleum-bearing formation at half the offset distance, i.e. 2.5 km. The towing direction in this figure is from the beginning of the profile to the north.

FIG. 6a is a corresponding survey map for two electric seabed logging lines conducted across the Grane field in 2004.

Figure 6B:
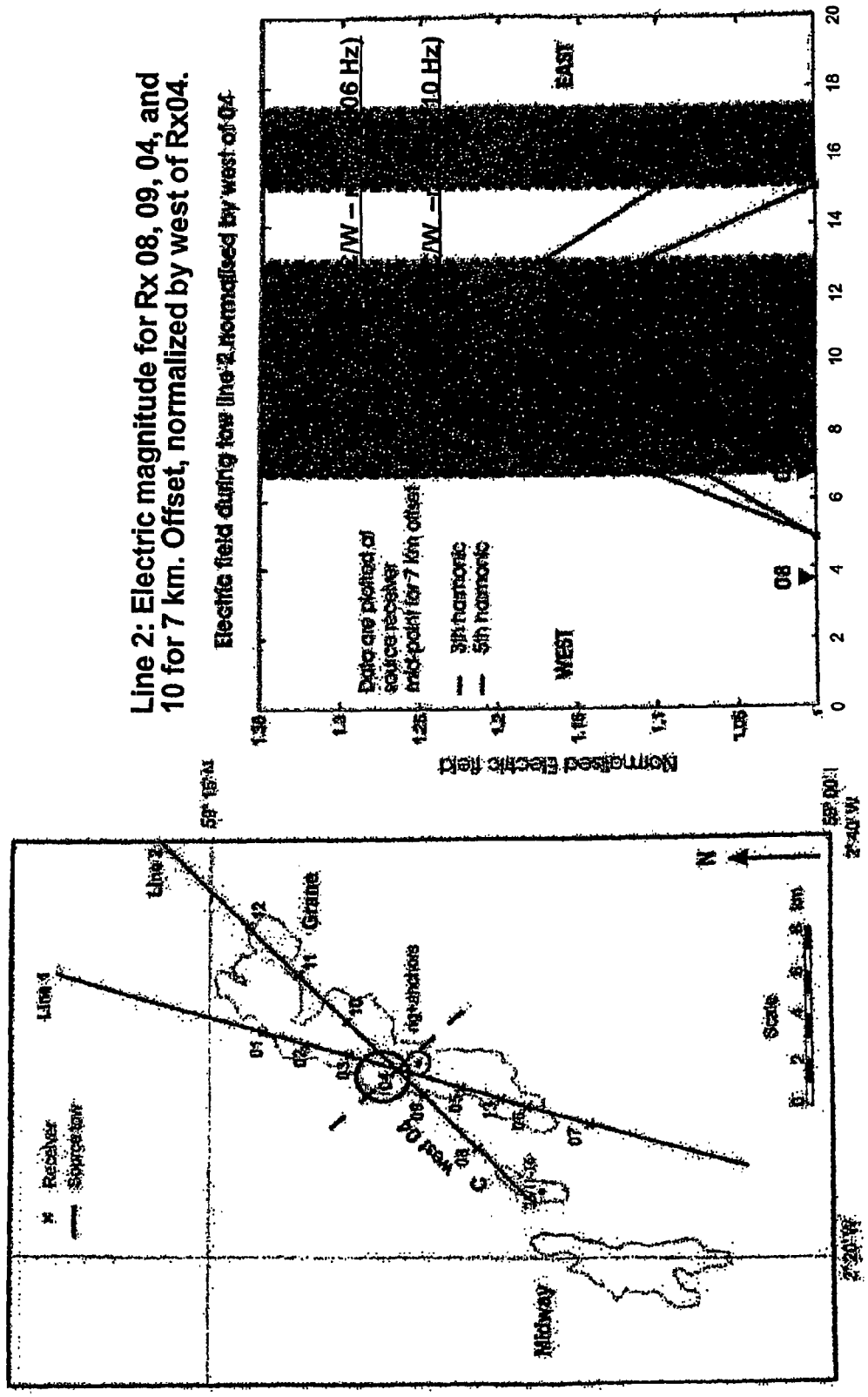

FIG. 6b is similar to FIG. 5c, but for a survey made in 2004 for tow Line 2 as indicated in FIG. 6a.

Figure 6C:
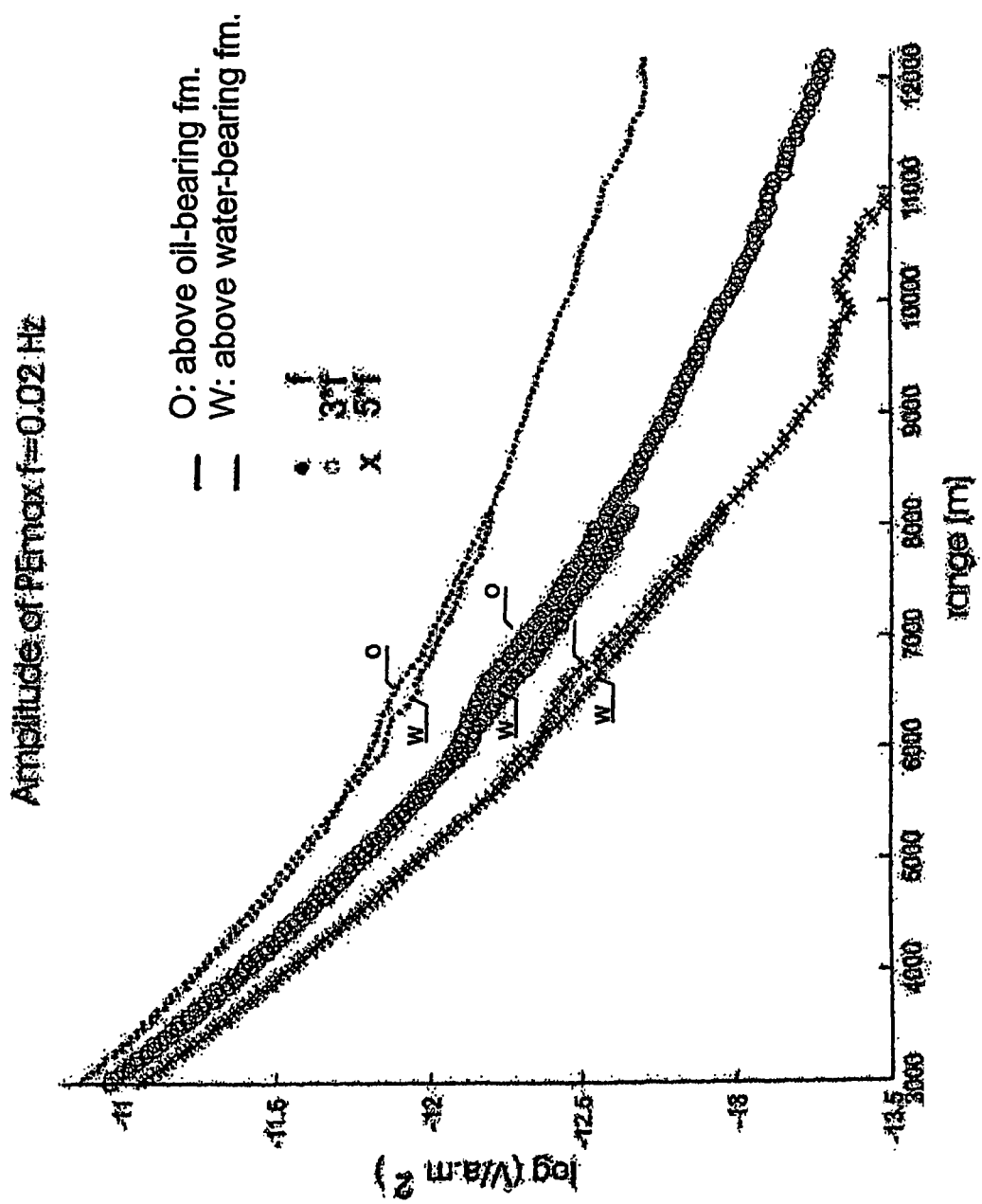

FIG. 6c is an electrical magnitude plot as received on one single receiver, Rx10, of line 2 of the Grane 2004 survey. The transmitted signal is a square pulse having a fundamental frequency of f=0.02 Hz, and thus harmonic frequencies of 3*f, 5*f, 71, and so on. The curves "O: above oil-bearing fm." are compared to a signal registered at a reference station outside the reservoir, the "W: above water-bearing fm." The displayed measured range is in meters from 3000 m to 12000 m offset for the station Rx10, and from 3000 m to about 8000 m for the reference station. The ordinate axis is in log amplitude of the source-normalised received signal, from $10^{-13.5}$ V/Am$^2$ to $10^{-11}$ V/Am$^2$.

DETAILED DESCRIPTION OF PREFERRED EMBODIMENTS OF THE INVENTION

The invention is a method for determining electrical properties of a submarine petroleum fluid bearing formation 1 having an overburden 2 of geological layers 2 thickness s and having a seafloor 3 covered in the area of interest by a sea 4.

The method comprises the following steps:

One or more of electromagnetic receivers 8 arranged in said sea 4. The electromagnetic receivers 8 may be pairs of electrodes held by beams 82 of a desired length, and carrying some signal storing device 81 held in a receiver compartment 80 arranged for holding said antenna beams 82. Such antenna beams are usually arranged in an orthogonal pair and the in-line signal is calculated from in-line components of the orthogonal pair. Said signal storing device 81 should be provided with a clock for recording the actual time for registering received signals 12 explained below.

One or more transmitter antennas 9 should be arranged in the sea 4.

Said transmitter antenna 9 is then used for transmitting electromagnetic signals 10 of one or more pulses 11 having frequencies between 0.01 Hz and 0.10 Hz. In the present embodiment of the invention, a frequency of 0.02 Hz has been used. Stated in an alternative way, a wavelength l more than 5 times the thickness s of said overburden layers 2 may be used. Previously, air pulses propagating from said transmitter 9 to said antennas 8 were believed to overshadow desired information about a geological petroleum bearing reservoir 1, but new modelling for shallow sea depth has clearly indicated that either a significant increase or decrease occurs for the detected signal at intermediate offsets, even for very shallow waters.

The actual depth d of said sea 4 for the present invention to be carried out is 10 or 20 to 400 meters, more preferably 50-350 meters, and most preferably about 80 meters to about 300 meters. This corresponds to actual depths of the North Sea. Other depths may be relevant for other sea areas of the world.

Much of the energy of the emitted signal pulses 11 is attenuated due to the resistivity of the seawater, the overburden, but a small proportion of the energy is eventually received. Electromagnetic signals 12 due to said emitted electromagnetic signals 10 propagate for a portion of the emitted energy to be significantly detected at said receivers 8 having an offset from said transmitter 9, provided that said transmitter has a sufficient capacity for emitting electromagnetic signals, as described below.

One or more components of said detected signals 12 is analyzed for offset distances between about 3 km to about 10 km between the transmitter 9 and receivers 8. It is expected that for such offsets, said detected signals 12 will differ significantly from a corresponding signal 12' that would be detected from a similar but water bearing formation 1, said differing signal indicating that said formation 1 is petroleum-fluid bearing.

Towing Method

According to the method of the invention, said one or more receivers 8 are arranged on said seafloor 3, and said preferably one transmitter 9 is towed in said sea 4 by a marine vessel 5, either a surface vessel or a submarine vessel. Said transmitter 9 may be towed on said seafloor 3, but in order not to enforce a destructive electrical current onto a receiver 8 while being moved near the necessarily very sensitive electrical receiver 8, the transmitter 9 could be towed 30 to 70 meters above said receiver 8 if the track is more or less directly over the receiver. Alternatively, according to the method of the invention, said receivers 8 may be towed in said sea 4, said receivers being arranged as one single towed receiver 8 or several receivers 8 arranged on a cable towed after a marine vessel 5.

According to an alternative embodiment of the invention, said receivers 8 may be towed on said seafloor 3.

Analysis

Figure 2:
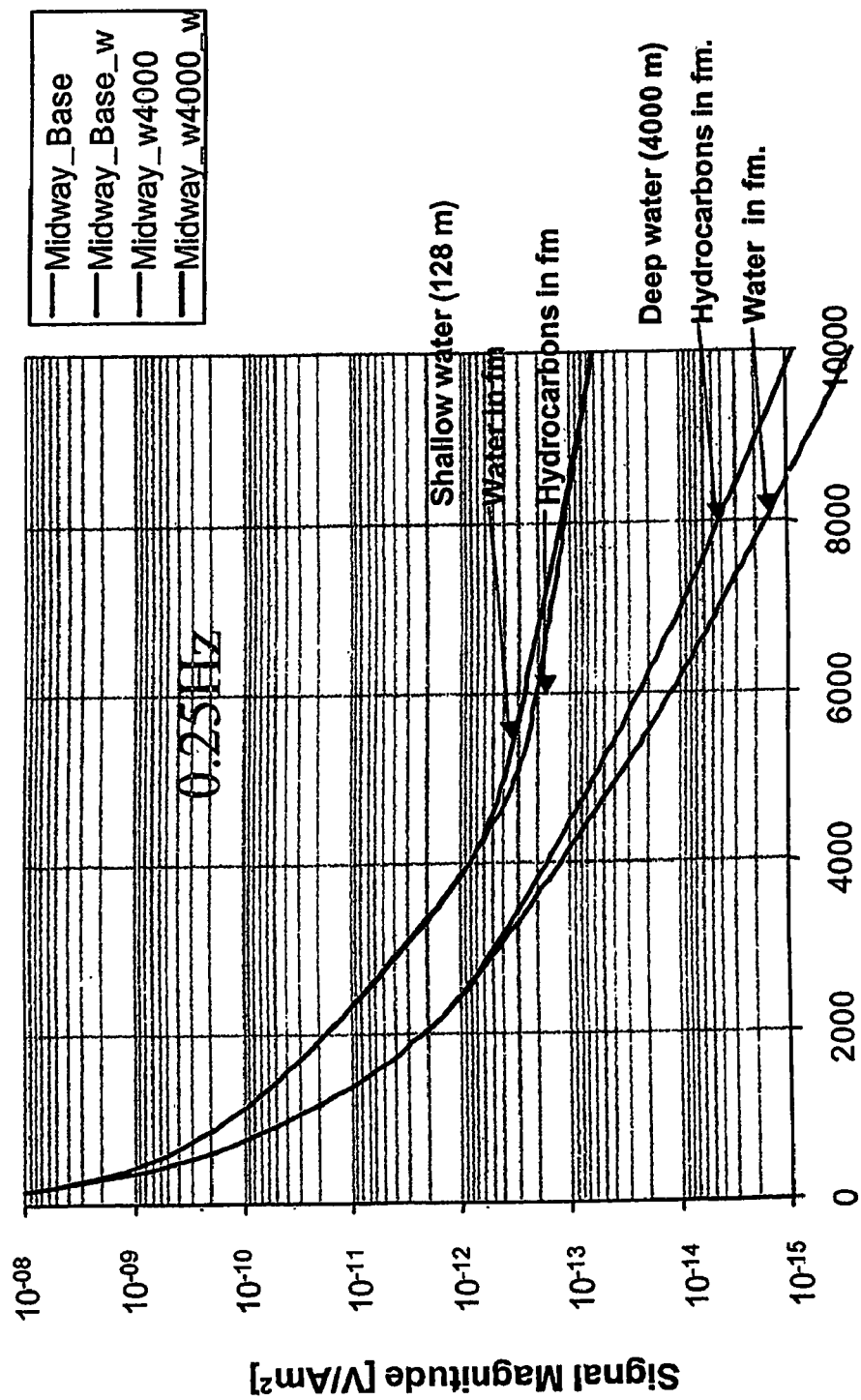
FIG. 2 illustrates the horizontal component of the amplitude of a signal received at one station at the seafloor, from a towed electromagnetic transmitter sending an AC current in the sea. The emitted frequency is 0.25 Hz. The signal is normalized with respect to transmitter source strength.

The analysis may be conducted with respect to amplitude of said detected signals 12, using so-called 1-D modelling as illustrated in FIG. 2, and particularly in the normalized curves in FIGS. 3 and 4. A 1-D model may be based on a single borehole log of measured resistivity of the layers of geological formations surrounding the borehole. In a 1-D modelling there may be no depth variation of the interfaces between the layers. In a 2-D modelling, e.g. using resistivity measurement data from two drilled wells, depth variation of the layers may be introduced to better match the actual geological structure along the measured line.

FIG. 4f represents the curve for 0.5 Hz, i.e. a period of 2 seconds at a sea depth of 128 meters. The thickness of the overburden in the model is about 1600 m of resistivity 1 Ohm-meter, and the reservoir thickness of the model is 100 m of 80 Ohm-meter resistivity. This illustrates one major problem using such high frequencies at relatively shallow water compared to the thickness of the overburden: the response in the source-normalized amplitude curve is negligible. This is modelled data, and real data would have natural resistivity variations with depth that could probably hide such small signal anomalies below the noise level.

Above FIG. 4f, FIG. 4e represents the corresponding curve for 0.25 Hz, i.e. a period of 4 seconds, for the same sea depth. A significant so-called anomaly in the source-normalized amplitude can be seen as a slight increase in the normalized amplitude curve between 2 and 3.5 km, and a strong decrease of normalized amplitude starting at 3.5 km and reaching its broad minimum of 0.80 at about 4.8 km, and slowly returning to the unit curve at about 8 km. The curve may be described as a distorted wavelet having a small narrow positive portion followed by a larger and broader negative portion. The corresponding wavelet of FIG. 4f is inverse and very insignificant.

FIG. 4d is a corresponding normalized curve for a transmitted frequency of 0.20 Hz, giving a period of 5 seconds. The depth is as with the other models of FIG. 4: 128 meters. The negative anomaly is now displaced to start at 4 km, the amplitude minimum is more pronounced to a value of about 0.75 and displaced to longer offset at 5.5 km, and rebounds further out at 10 km. The increasing offset associated with the onset, maximum, unit crossing and minimum, with decreasing frequency, is indicated by horizontal arrows in FIGS. 4d, 4c, and 4b.

The changes of the curves are further seen with decreasing frequencies. FIG. 4c is a corresponding normalized curve for a transmitted frequency of 0.10 Hz, i.e. a period of 10 seconds. The source-normalized amplitude curve now has its positive portion of the wavelet significantly widened and increased, starting at 2 km, increasing to about 1.28 of the source-normalized amplitude at an offset of about 5.2 km, and plunging below the unit line at about 6.5 km to a minimum that is more negative than 0.75.

The effects indicated in FIGS. 4d and 4c are seen further in FIG. 4b, which is a corresponding normalized curve for a transmitted frequency of 0.05 Hz, i.e. a period of 20 seconds, same depth. The onset is as for 0.10 Hz at about 2 km, but of much stronger amplitude for 0.05 Hz, increasing to more than 1.52 at an offset of about 6.9 km, and plunging through the unit line at 9.9 km. The negative portion of the curve is so offset that is has not been calculated outside the offset of 10 km.

The preliminary strongest maximum is illustrated in FIG. 4a that is also such a normalized measurement curve of the horizontal inline field for a transmitted frequency of 0.025 Hz, i.e. a period of 40 seconds, and a water depth of 128 m. The onset is now at about 2.2 km, and the positive portion is very broad and is as strong as 1.62 at the normalized curve and offset with the maximum occurring at about 9.2 km, the negative portion to be found far off 10 km, if existing.

It can be seen from the calculated source-normalized amplitude curves that using very low frequencies in the range from about 0.025 Hz to about 0.25 Hz, far more significant anomalies may be found using a model of a high-resistivity formation below an overburden of ordinary resistivity, and shallow sea water. Knowing the depth and the thickness of the potentially petroleum-bearing formation from seismic analysis, but not the resistivity, that particular question may be given an answer using the method according to the invention.

FIG. 4g is a normalized curve for 0.25 Hz and deep water, here 1024 m. It has been assembled on the same sheet as a copy of FIG. 4e showing the corresponding curve for 0.25 Hz and shallow water conditions, here 128 m. What is clearly seen is that for deep water, a very clear and significant normalized signal over the oil-bearing formation in deep water is seen, as compared to the normalized curve over shallow water. One major difference between the two cases is that for shallow water conditions, a larger portion of the emitted signal may leak to the air and have a significant influence on the recorded signal. However, attempts for separation of up- and down-going fields, as well as air-wave subtraction, has so far been unsuccessfully tried. It is highly desirable to have an electromagnetic method that provides more significant electromagnetic anomalies above oil-bearing formations also for shallow waters.

Signal Emission

According to a preferred embodiment of the invention, said transmitted signal pulses 11 being generally square pulses comprising first, harmonic cosine waves being detectable far away. One advantage using low frequencies according to the invention is that also third harmonic waves and fifth harmonic waves may be detectable at said intermediate distances. This makes it possible to conduct independent analyses for different frequencies. Using a base frequency for the transmitted square pulse of 0.02 Hz, one would receive a remote signal composed of the following:

a cosine wave of 0.02 Hz, a third harmonic cosine wave of 0.02*3 Hz=0.06 Hz, having one third of the energy, a fifth harmonic cosine wave of 0.02*5 Hz=0.10 Hz, having one fifth of the energy, a seventh harmonic cosine wave of 0.02*7 Hz=0.14 Hz, and so on, all of which may be independently filtered and analysed, broadening the basis of analysis. The different harmonic waves will have different propagation speeds.

Below are listed propagation velocity and electromagnetic wavelength for some values of overburden resistivity and emitted low frequencies.

| R (Ohm-m) | f (Hz) | velocity (m/s) | wavelength lambda (m) |
|---|---|---|---|
| 1 | 0.02 Hz | 447 m/s | 22400 m |
| 2 | 0.02 Hz | 632 m/s | 31600 m |
| 3 | 0.02 Hz | 775 m/s | 38700 m |
| 1 | 0.06 Hz | 775 m/s | 12900 m |
| 2 | 0.06 Hz | 1095 m/s | 18300 m |
| 3 | 0.06 Hz | 1342 m/s | 22400 m |
| 1 | 0.10 Hz | 1000 m/s | 10000 m |
| 2 | 0.10 Hz | 1414 m/s | 14000 m |
| 3 | 0.10 Hz | 1732 m/s | 17300 m |
| 1 | 0.20 Hz | 1414 m/s | 7070 m |
| 2 | 0.20 Hz | 2000 m/s | 10000 m |
| 3 | 0.20 Hz | 2449 m/s | 12200 m |

It may be seen that the wavelengths used for 1, 2 or 3 Ohm-meter resistivity in the overburden sending with a very low frequency of 0.02 Hz result in extremely long wavelengths of between 22400 m and 38700 m.

Transmitter Antenna

According to the invention, said transmitter antenna 9 has an equivalent product of current I times length L component in the horizontal direction of between about 10000 Am, preferably up to 300000 Am or more, in general horizontally, as explained below. The transmitter antenna 9 should preferably be arranged to carry an electrical current between about 80 A and 2000 A, and have a length of 50 to 500 m. Transmitting the signal may then comprise simply producing a DC of, say, about 80 A to about 2000 A, preferably in the range from 100 A to 1000 A, and sending the direct current through the two transmitter electrodes 9A, 9B arranged about 5-70 m above the seafloor separated by a generally horizontal distance of about 50 m to about 500 m, preferably about 100 to about 300 m, producing an equivalent product of about 400 Am to about 1000000 Am, preferably from 10000 Am to 300000 Am. Using a base frequency for the transmitted square pulse of 0.02 Hz as used in the present example, i.e. having a period of 50 s, one may simply reverse the electrical current each 25 second to produce the electrical square pulse of length 50 s desired.

Results

FIG. 2 illustrates the horizontal component of the amplitude of a signal received at one station at the seafloor, from a towed electromagnetic transmitter sending an AC current in the sea. The signal comprises both received reflected signals and refracted signals, direct signals through the seawater, and partially air propagated wave signals. One pair of curves is calculated according to a model with shallow water, 128 m, and the other pair of curves is calculated according to a model with deep water, 4000 m. The emitted frequency is 0.25 Hz. The denomination of the ordinate is given in electrical field strength V/m normalized with respect to transmitter source strength Am, $(V/m)/(Am) = V/Am^2$, a source-normalized amplitude called magnitude. The noise floor is often considered to be between $10^{-15}$ V/Am$^2$ to $10^{-13}$ V/Am$^2$. The offset along the abscissa is in kilometers. The lower pair of curves indicates the amplitude of the electrical horizontal field as measured in deep water, here 4000 m. For offsets more than about 2000 meters, the curve calculated for an oil-bearing formation is above the curve indicating a water-bearing formation, and the difference is quite distinguishable. The upper pair of curves however, is calculated for shallow water, here 128 m. A reduction of amplitude is seen between 4500 and 8000 m in this view, but the difference is rather small, and may be masked rather easily by other effects like noise.

FIG. 3 illustrates normalized curves in which a signal amplitude curve of an anomalous formation of high resistivity, e.g. due to being petroleum-bearing, with overburden of ordinary resistivity, like in FIG. 1a, is divided by a corresponding signal amplitude curve as if the petroleum of the same formation is replaced by water resulting in ordinary resistivity. The offset along the abscissa is given in kilometers. A dashed line indicating the amplitude curve due to the anomalous oil-bearing formation for a 0.25 Hz transmitted wave is indicated. The normalized <<water curve>> indicating water, is a reference curve based on water-bearing reservoir formations, is given the value 1. This may be done using data from a data acquisition profile crossing a portion of the formation that is known to be water-bearing. Between 3.5 and 8 km, the resistivity of the water-bearing formation is lower than if the same formation was petroleum-bearing. A line indicating the amplitude curve due to the anomalous oil-bearing formation for a 0.25 Hz wave as calculated for shallow water depth of 128 m is indicated. In this view, it is more clearly seen that there is a small but significant difference for 0.25 Hz, but this difference is vulnerable to noise.

FIG. 5a is a map of the electromagnetic seabed logging program in 2003 over the Grane oilfield in the North Sea. The reservoir portion of the reservoir formation is roughly outlined. A north-south running electromagnetic sounding line is indicated across the map. Receiver stations 12, 13, 14, 15, and 16 are placed in the portion of the profile across the northern limits of the oil-baring formation in this profile. Receiver stations 1-11 are placed in the portions of the profile across the southern limits of the oil-bearing formation in this profile. Over the central portions of profile over the petroleum-bearing formation of the Grane field, no receivers are placed.

FIG. 5b is a normalized electrical magnitude plot as received on one single receiver, Rx12, for a transmitted frequency of 0.25 Hz. The <<water>>-curve and the <<HC>>-curve shows a small but significant difference between 4 and about 7 km in these real data.

FIG. 5c shows a summary plot of normalized electrical magnitude for all receivers. The abscissa is in meters. The receivers 1-16 are indicated along the abscissa, and correspond to the profile line shown in FIG. 5a. In this plot, the normalized electrical magnitude for one particular source-receiver offset is picked from each registration from the stations Rx1-Rx16. The offset for the picked normalized field value is 5 km. It is assumed that the 5 km offset registration indicates an electrical property value of the potential petroleum-bearing formation at half the offset distance, i.e. 2.5 km. The towing direction in electrical magnitude for one particular source-receiver offset is picked from each registration from the stations Rx08, Rx09, Rx04, and Rx10. The source-receiver offset for the picked normalized field values are 7 km, and the values are plot halfway, 3.5 km from the receiver and 3.5 km from the transmitter. It is indicated in the shadowed columns between 7 and 13 km, and between 15 and 17.5 km where the Hydro estimated petroleum reservoir extends. In this survey is used a square pulse of very low transmitter frequency of 0.02 Hz. In this plot, the 3*f and 5*f harmonic wave components have been analysed. Both the 3*f and 51 harmonic normalized plots display a much more distinct signal ratio, varying between about 1.06 and 1.10 at the transition between petroleum-bearing formation at station Rx09, to between about 1.22 and 1.30 to the SW of station Rx10 near the middle of the petroleum-bearing formation. This result from the 2004 survey using a square pulse of 0.02 Hz indicates more distinctly the presence of petroleum in the reservoir formation than the plot from the 2003 survey using a wave frequency of 025 Hz. Another difference is that the ratio is above unity for the ultra-low frequency of 0.02 Hz used, as compared to the below unity ratio for the wave frequency of 0.25 Hz used.

FIG. 6c is an electrical magnitude plot as received on one single receiver, Rx10, of line 2 of the Grane 2004 survey. The transmitted signal is a square pulse having a fundamental frequency of f=0.02 Hz, and thus the emitted signal contains harmonic frequencies of 3f, 5f, 7f, and so on. Station Rx10 is situated above an oil-bearing portion of the reservoir. The curves are also compared to a signal registered at a reference station outside the reservoir, which may be used for normalizing. The displayed measured range is in meters from 3000 m to 12000 m offset for the station Rx10, and from 3000 m to about 8000 m for the reference station. The ordinate axis is in log amplitude of the source-normalized received signal, from $10^{-13.5}$ V/Am$^2$ to $10^{-11}$ V/Am$^2$. Even without normalizing the received signals, the received fundamental frequency signal f=0.02 Hz and the odd harmonics filtered 3f=0.06 Hz and 5f=0.10 Hz, clearly display a response that is generally higher than the signal from the reference station. Beyond 8000 m no reference signal for comparison has been plotted. The f=0.02 Hz "above oil" signal over the oil-bearing portion of the formation is distinctly higher than the reference signal between about 5000 m and 8000 m. The f=0.02 Hz signal is so far in rough agreement with the range of Which the theoretical curve of 0.025 Hz of FIG. 4a is above normalized unity. The 3*f=0.06 Hz is over the reference curve of FIG. 6c between 5.5 km and at least 8 km offset, also being in rough agreement with the closest modelled curve of 0.05 Hz. The 5*f curve is below the reference curve between about 5.5 km and 6 km, and above unity between about 6 km and about 7.7 km, not being entirely in agreement with the offset range of the modelled data for 0.10 Hz, but significantly differing from the "above-water" signal.

The invention claimed is:

1. A method for determining electrical properties of a submarine petroleum fluid-bearing formation under overburden geological layers of thickness s under a seafloor of a sea, said method comprising:

arranging one or more transmitter antennas in said sea, and arranging one or more electromagnetic receivers in said sea, said sea having a shallow sea depth of about 50 meters to about 350 meters;

using said transmitter antenna transmitting electromagnetic signals of one or more pulses having frequency of very low frequency between about 0.01 Hz and about 0.10 Hz;

using said receiver antennas, having an offset from said transmitter, for receiving propagated electromagnetic signals due to said emitted electromagnetic signals; and analyzing one or more components of said received signals from receivers having offsets between about 1 km and about 12 km, whether said signals differ significantly from a corresponding signal that would occur from a water-bearing formation, indicating a petroleum fluid-bearing formation.

2. The method of claim 1, wherein said transmitted signal pulses comprise generally square pulses.

3. The method of claim 1, wherein said signals have a wavelength (l) of more than 5 times said thickness of said overburden layers.

4. The method of claim 1, wherein said receivers are arranged on said seafloor.

5. The method of claim 1, wherein said transmitter is towed in said sea.

6. The method of claim 1, wherein said transmitter is towed on said seafloor.

7. The method of claim 1, wherein said receivers are towed in said sea.

8. The method of claim 1, wherein said receivers are towed on said seafloor.

9. The method of claim 1, wherein said analyzing is made with respect to amplitude of said detected signals.

10. The method of claim 9, wherein said receivers are towed on said seafloor.

11. The method of claim 1, wherein said transmitted signal pulses are generally square pulses comprising at least harmonic waves of frequency 3*f being detectable at said offsets.

12. The method of claim 1, wherein a length of said transmitter antenna is in a range of 50 m to about 500 m.

13. The method of claim 1, wherein a length of said transmitter antenna is in a range of 100 m to 300 m.

14. The method of claim 1, wherein said transmitter antenna carries an electrical current in a range of 80 A to 2000 A.

15. The method of claim 1, wherein said transmitter antenna carries an electrical current in a range of 100 A to 1000 A.

16. The method of claim 1, wherein said transmitter antenna has an equivalent product of current (I) times length (L) component in the horizontal direction in a range of 400 Am to 1000000 Am.

17. The method of claim 1, wherein said transmitter antenna has an equivalent product of current (I) times length (L) component in the horizontal direction in a range of 10000 Am to 300000 Am.

* * * * *